United States Patent
Cirone et al.

(10) Patent No.: US 12,541,563 B2
(45) Date of Patent: Feb. 3, 2026

(54) INSTRUMENTATION OF SOFT NAVIGATION ELEMENTS OF WEB PAGE APPLICATIONS

(71) Applicant: Oracle International Corporation, Redwood Shores, CA (US)

(72) Inventors: Kevin J. Cirone, Tewksbury, MA (US); Blake T. Sullivan, Redwood City, CA (US); Dipankar Bajpai, Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/364,333

(22) Filed: Aug. 2, 2023

(65) Prior Publication Data

US 2025/0045340 A1 Feb. 6, 2025

(51) Int. Cl.
G06F 16/954 (2019.01)
G06F 16/958 (2019.01)

(52) U.S. Cl.
CPC .......... *G06F 16/954* (2019.01); *G06F 16/958* (2019.01)

(58) Field of Classification Search
CPC ............................. G06F 16/954; G06F 16/958
See application file for complete search history.

(56) References Cited

U.S. PATENT DOCUMENTS

| | | | |
|---|---|---|---|
| 10,455,043 B2 | 10/2019 | Wei et al. | |
| 10,776,252 B1 | 9/2020 | Weiss | |
| 11,403,157 B1 | 8/2022 | Ross | |
| 2004/0015736 A1 | 1/2004 | Mihara | |
| 2009/0210890 A1* | 8/2009 | Tully | H04L 67/02 719/331 |
| 2012/0179744 A1 | 7/2012 | Sullivan et al. | |
| 2012/0259969 A1 | 10/2012 | Mastrangelo et al. | |
| 2014/0136693 A1 | 5/2014 | Greifeneder et al. | |

(Continued)

OTHER PUBLICATIONS

International Patent Application No. PCT/US2024/040336, International Search Report and Written Opinion, Mailed On Oct. 30, 2024, 14 pages.

(Continued)

*Primary Examiner* — Stephen S Hong
*Assistant Examiner* — Darrin Hope
(74) *Attorney, Agent, or Firm* — Kilpatrick Townsend & Stockton LLP

(57) ABSTRACT

Disclosed techniques relate to instrumenting applications. In an example, a method involves providing a web page application with a tracer application. The method further involves accessing a source of the web page application. The method further involves detecting a reference to an element of the web page application in the source. The method further involves detecting the user interaction with the web page application. The method further involves automatically logging a start of a span based on the detection of the user interaction. The logging includes associating the span with the tracer application. The method further involves executing operations relating to the element. The method further involves determining that the element is ready for additional user interactions. The method further involves automatically logging an end of the span based upon the determining.

20 Claims, 11 Drawing Sheets

(56) References Cited

U.S. PATENT DOCUMENTS

| | | |
|---|---|---|
| 2015/0281035 A1* | 10/2015 | Melikyan ............ G06F 11/3466 709/224 |
| 2016/0098697 A1 | 4/2016 | Dunsmore et al. |
| 2016/0315842 A1 | 10/2016 | Boss et al. |
| 2017/0132111 A1* | 5/2017 | Ravindranath Sivalingam ........... G06F 11/3476 |
| 2017/0237799 A1 | 8/2017 | Veeravalli et al. |
| 2019/0310931 A1 | 10/2019 | Ocariza, Jr. et al. |
| 2021/0216438 A1 | 7/2021 | Mola |
| 2022/0027827 A1 | 1/2022 | Flacher et al. |
| 2022/0083447 A1 | 3/2022 | Cirone et al. |
| 2022/0083454 A1 | 3/2022 | Cirone et al. |
| 2022/0276953 A1 | 9/2022 | Padala et al. |

OTHER PUBLICATIONS

U.S. Appl. No. 18/364,320, "Non-Final Office Action", mailed Jul. 2, 2025, 18 pages.
U.S. Appl. No. 18/364,327, "Non-Final Office Action", mailed Jun. 17, 2025, 20 pages.
U.S. Appl. No. 18/364,342, "Non-Final Office Action", mailed Jun. 18, 2025, 23 pages.
International Application No. PCT/US2025/026737, "International Search Report and Written Opinion", mailed Aug. 5, 2025, 11 pages.

* cited by examiner

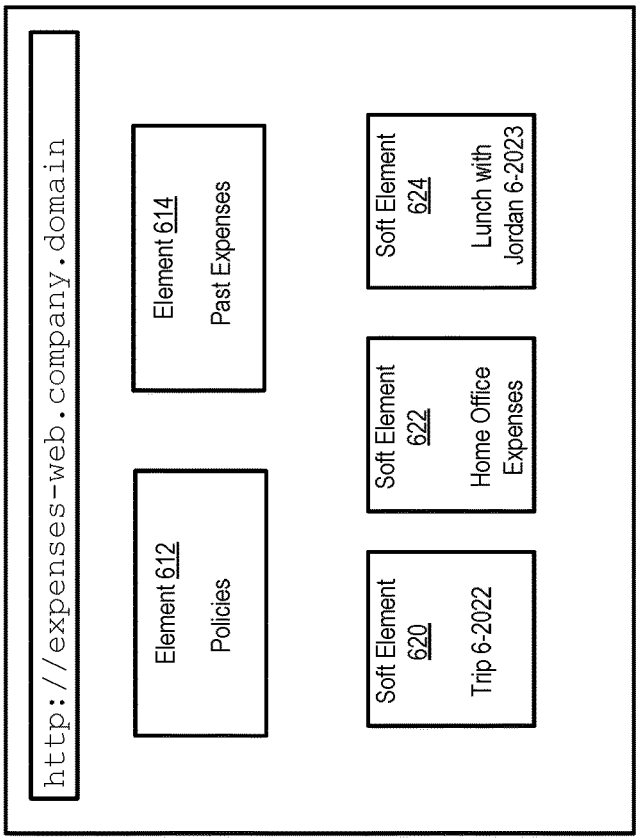
FIG. 6B
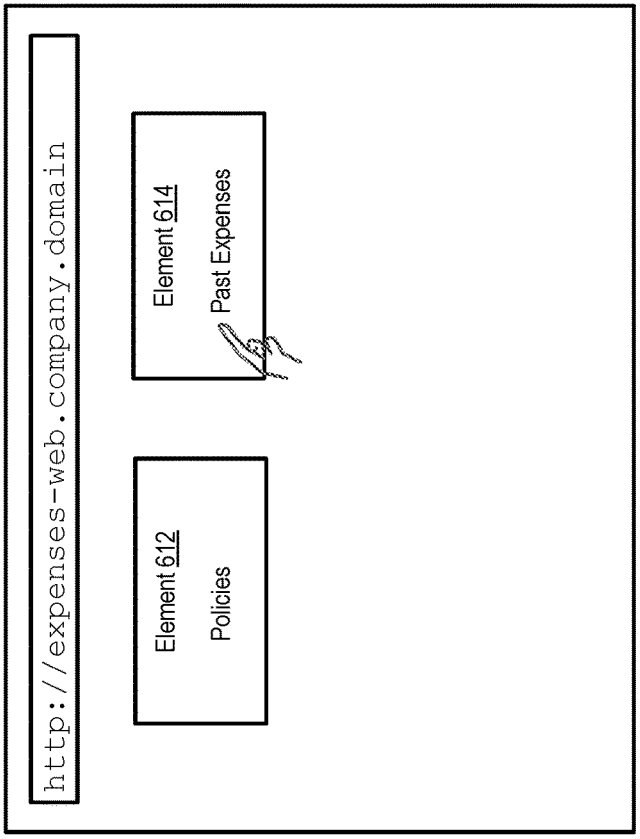
FIG. 6A
FIG. 6

INSTRUMENTATION OF SOFT NAVIGATION ELEMENTS OF WEB PAGE APPLICATIONS

CROSS-REFERENCES TO RELATED APPLICATIONS

This application is related to co-pending U.S. patent application Ser. No. 18,364,320, titled "Instrumentation of web based applications affected by user inactivity" filed Aug. 2, 2023, co-pending U.S. patent application Ser. No. 18,364/327, titled "Techniques for telemetry data comparison for regression detection," filed Aug. 2, 2023, and co-pending U.S. patent application Ser. No. 18,364/342, titled "Techniques for test automation generation from telemetry data" filed Aug. 2, 2023, the contents of each of which is hereby incorporated by reference in their entirety for all purposes.

TECHNICAL FIELD

This application relates generally to instrumentation of web page applications and in particular, but without limitation, to instrumentation of priority elements associated with soft navigations within web page applications.

BACKGROUND

As web-based applications become more advanced, traditional tracer applications may be unable to capture accurate telemetry data within a web-page application that has dynamically-loaded elements. Disclosed solutions facilitate improved telemetry capabilities and analytics that overcome these deficiencies.

BRIEF SUMMARY

In an aspect, a method involves providing, to a web browser on a client device, a web page application that includes a tracer application. The method further involves accessing, via the tracer application, a source of the web page application. The method further involves detecting, via the tracer application and in the source, a reference to an element of the web page application. The element can be triggered by a user interaction with the web page application and has a priority designation. The method further involves detecting, via the tracer application, the user interaction with the web page application. The method further involves automatically logging a start of a span based on the detection of the user interaction. The logging includes associating the span with the tracer application. The method further involves executing operations relating to the element. The method further involves determining that the element is ready for additional user interactions. The method further involves automatically logging an end of the span based upon the determining.

In an aspect, the method further involves automatically starting an additional span related to a subset of the operations. The subset of the operations are associated with a rendering of the element. The additional span is a child span of the span. The method further involves automatically logging an end of the additional span based upon a completion of the subset of the operations.

In an aspect, detecting the reference to an element of the web page application includes executing, within the tracing application, a mutation observer that analyzes the source of the web page; and determining, via the mutation observer, that the source has changed.

In an aspect, automatically logging the end of the span includes determining one or more of: a number of processing cycles corresponding to the execution of the operations or an execution time of the operations.

In an aspect, the method further involves determining, from the source of the web page application, that an additional element is triggered by the user interaction. The method further involves, in response to the determining that the additional element is triggered by the user interaction, automatically logging an additional start of an additional span, the logging including associating the additional span with the tracer application. The method further involves, in response to the determining that the additional element is triggered by the user interaction, executing additional operations relating to the additional element. The method further involves, in response to the determining that the additional element is triggered by the user interaction, determining that the additional element is ready for user interactions. The method further involves, in response to the determining that the additional element is triggered by the user interaction, automatically logging an end of the additional span based upon the determining; and outputting a combined span representing completion of the span and the additional span.

In an aspect, determining that the element has the priority designation by identifying, in the source of the web page application, one or more attributes associated with the element.

In an aspect, the operations relating to the element include transmitting, to an external server, a request for the element. The operations relating to the element further include creating a child span based on the transmitting. The operations relating to the element further include receiving the element from the external server. The operations relating to the element further include automatically logging an end of the child span responsive to receiving the element. The operations relating to the element further include associating the child span with the span.

The above methods can be implemented as tangible computer-readable media and/or operating within a computer processor and attached memory.

BRIEF DESCRIPTION OF THE DRAWINGS

FIG. 6, which includes views 6A and 6B, depicts an example of a web page application having priority elements, according to an aspect of the present disclosure.

DETAILED DESCRIPTION

Figure 1:
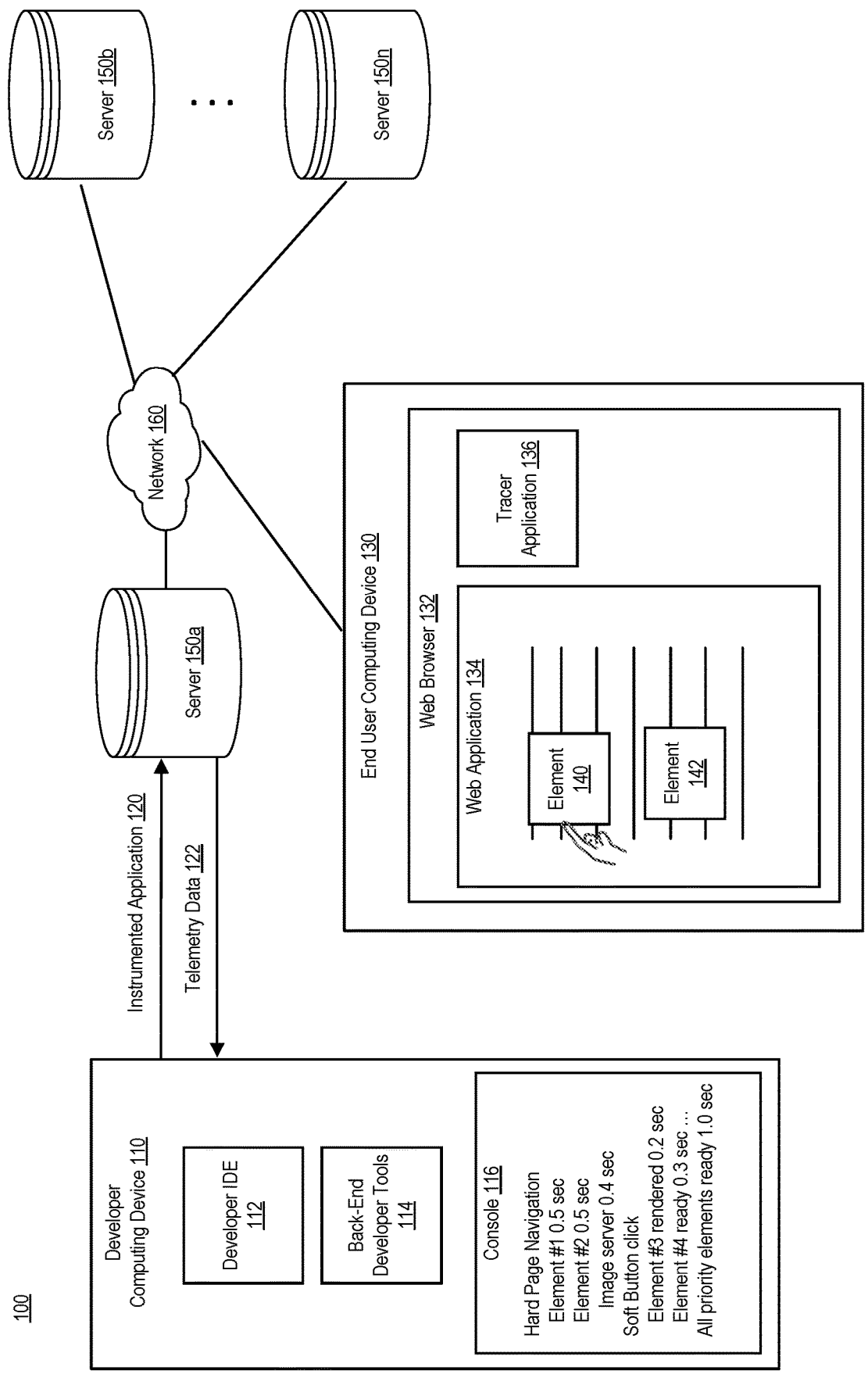
FIG. 1 depicts an example of a system for automatically instrumenting enterprise applications having priority elements, according to an aspect of the present disclosure.

Techniques disclosed herein include solutions for automatically providing telemetry capabilities for enterprise applications. Telemetry refers to gathering of performance data about the runtime execution of software. Examples of such data include how often certain features on a web page or application are used, measurements of start-up time or execution time, whether a process crashed, failure information, and user experiences.

Telemetry data can be gathered on an application basis, or on a more granular level, such as runtime metrics on how long each process of the web page took to complete. Disclosed solutions use Application Programmer Interface (API) capabilities to enable access to the telemetry data.

Telemetry can be performed on web-based applications, such as how long a web page application takes to load (e.g., a "hard navigation"). But web page applications typically involve dynamically-loaded elements. Dynamically-loaded elements can include elements such as images or links that are loaded or made available after a user navigates within the web-page or "soft navigations." Readiness of these dynamically loaded elements is important to the user's experience. But existing solutions are unable to instrument these dynamically-loaded elements, which renders tracking of client-side performance difficult.

By contrast, disclosed techniques provide improved instrumentation of single web-page applications including dynamically loaded elements. For example, disclosed techniques are capable of instrumenting complex modern web pages in a platform-agnostic manner. Dynamically loaded elements can be identified as priority (or "hero") elements during page development. Then, at runtime, progress of these priority elements can be tracked independently.

To facilitate telemetry, within an enterprise application, one or more spans are created. As used herein, a span refers to a set of named operations that represent a unit of work. A particular span can refer to a process. A span has a span context. As used herein, a span context can include a trace identifier and a span identifier. Accordingly, a first process can have a first span and a second process a second span. If the second process is called by the first process, then the first and second spans are related by a parent-child relationship such that the first span is a parent and the second is a child. Tracking the spans of different processes facilitates a more detailed instrumentation.

Spans can be captured and emitted that correspond to when a priority element is rendered on the web page and to when the priority element is available, or ready. An element is ready when asynchronous processing relating to the element is complete, indicating when a complete experience is available to the user. Further, additional metrics can be gathered on when all such priority elements are ready. Disclosed techniques can therefore emit a span that encompasses an entire logical navigation of a single page web-application including indications of the loading of artifacts, timing details, and priority metrics that relate to the loading of prioritized page elements.

The following non-limiting example is introduced for discussion purposes. During web-page development, a web page developer marks each user interface element that is considered to be a priority element with a specific attribute indicating that the element is a priority element. Examples of such elements include, but are not limited to, elements which are dependent on soft navigation within the page. The web page is ultimately loaded onto a server, which serves the web page as appropriate.

Continuing the example, at runtime, the web page is downloaded from the server. The markings of the instrumented page are processed by the browser in conjunction with a tracer application. This processing causes, each priority element, a first metric to be emitted via the tracer application when the element is rendered and a second metric to be emitted when the corresponding element is ready. The metrics each correspond to a span and can include an execution time or cycles of the corresponding span. This process continues for each priority element. Additionally, a metric can be emitted when all the priority elements are ready.

FIG. 1 depicts an example of a system 100 for automatically instrumenting enterprise applications having priority elements, according to an aspect of the present disclosure. FIG. 1 depicts developer computing device 110, instrumented application 120, telemetry data 122, end user computing device 130, servers 150a-n, and network 160.

In the example depicted in FIG. 1, developer computing device 110 builds instrumented application 120 and deploys instrumented application 120 to server 150a. Server 150a, in turn, serves the application to end user computing device 150. During or in connection with the execution of instrumented application 120, end user computing device 150 may connect with one or more servers 150b-n to obtain different resources (e.g., images, scripts, etc.) and/or perform instrumentation functions. During or after execution of the instrumented application 120, telemetry data 122 is communicated back to developer computing device 110 for analysis.

Developer computing device 110 includes one or more of developer integrated development environment (IDE) 112, back-end developer tools 114, console 116, and telemetry data 122. Developer IDE 112 is a graphical development tool that provides compiling, linking, debugging, tracing, or other functionality. Back-end developer tools 114 can include one or more compilers, linkers, debuggers, simulators, and so forth. Console 116 is used to view telemetry data 122 obtained by the execution of instrumented application 120.

Servers 150a-n can be configured to perform identical, similar, or different functions. For example, servers 150a-n can operate as a distributed server system. In another example, servers 150a-n can be web-servers, file servers, or other servers that serve one or more components from web pages or can receive database queries and provide results. In some cases, servers 150a-n can be under the control of different entities (companies or individuals) and/or at different locations. Accordingly, certain aspects described herein relate to obtaining telemetry data across different servers via span context propagation. Developer computing device 110, end user computing device 130, network 160, and servers 150a-n can be connected across one or more connections such as network 160. Examples of network 160 include wired networks, wireless networks, and the Internet.

End user computing device 130 includes web page application 134 (e.g., a web page), web browser 132, and tracer application 136. Web page application 134 can include instrumented application 120 received from server 150a. Web page application 134 can be rendered by web browser 132. Web browser 134 includes element 140 and 142. While two elements are depicted, any number of elements are possible. In the example depicted, element 140 is displayed following loading of the web page application 134, e.g., a "hard navigation." When a user interacts, e.g., via clicks, drags, mouses-over element 140 (a soft-navigation), then web page application 134 causes element 142 to be loaded. Accordingly, a span and metrics related to rendering and/or readiness of element 142 can be obtained.

Tracer application 136, which can be part of web page application 134, provides instrumentation capabilities. For instance, tracer application 136 collects telemetry data, which can be exported to an external device periodically or on-demand. Examples of telemetry data include how often certain features are used, measurements of start-up time or execution time, whether a process crashed, failure information, and user types.

In an example, a software developer builds a custom web-based application using developer IDE 112 and back-end developer tools 114. In particular, software tools running on developer computing device 110 insert code (e.g., tracer code) that provides telemetry capability, generating instrumented application 120. In some cases, instrumented application 120 can be sent directly from developer computing device 110 to end user computing device 130. In other cases, instrumented application 120 is sent directly to a server 150a-n, where instrumented application 120 is hosted and later downloaded by end user computing device 130.

End user computing device 130 accesses the application, for example, from server 140a across network 160. A user operating end user computing device 130 interacts with the application, which causes the end user computing device 130 to access one or more of servers 140a-n, which, in turn, serve all or part of the application to the end user computing device 130. End user computing device 130 executes the telemetry functionality, which causes operations caused directly by user interactions with the application (e.g., clicks, reloads) or indirectly (e.g., images linked from a page to be loaded, etc.) to be instrumented. In this manner, more detailed telemetry information is available than with previous solutions. The telemetry data 122 is gathered by one or more servers 140a-n.

In a more specific example, instrumented application 120 is configured with one or more priority element markings. At runtime, instrumented application 120, e.g., web page application 134, causes one or more metrics representing one or more spans to be transmitted back with telemetry data 122 via server 150a to developer computing device. A mutation observer can be used to analyze the source of the web page to determine the priority elements.

For example, as depicted, telemetry data 122 includes data that a hard navigation required of loading of two elements, element #1 and element #2, which took 0.5 seconds to load respectively. Element #2 had an accompanying span of 0.4 seconds that represents a loading of an image from an image server. Console 116 also displays information relating to a soft page navigation, specifically, a soft button click which caused element #3 (e.g., element 142) to be rendered in 0.2 seconds and ready in 0.3 seconds. Console 116 also displays information relating to all priority elements being ready in 1.0 seconds.

Figure 2:
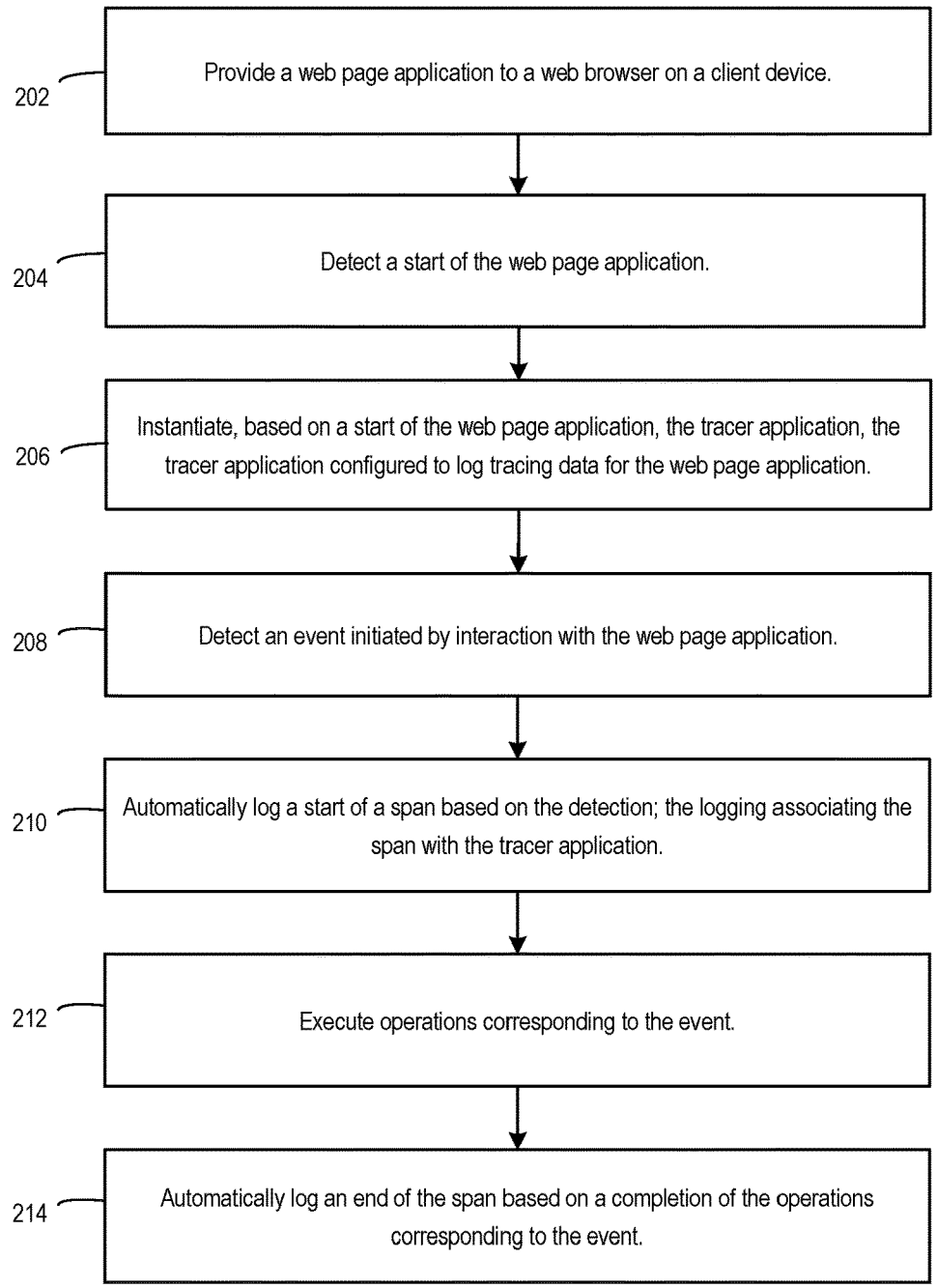
FIG. 2 depicts an example of a method used to gather telemetry data, according to an aspect of the present disclosure.
Figure 3:
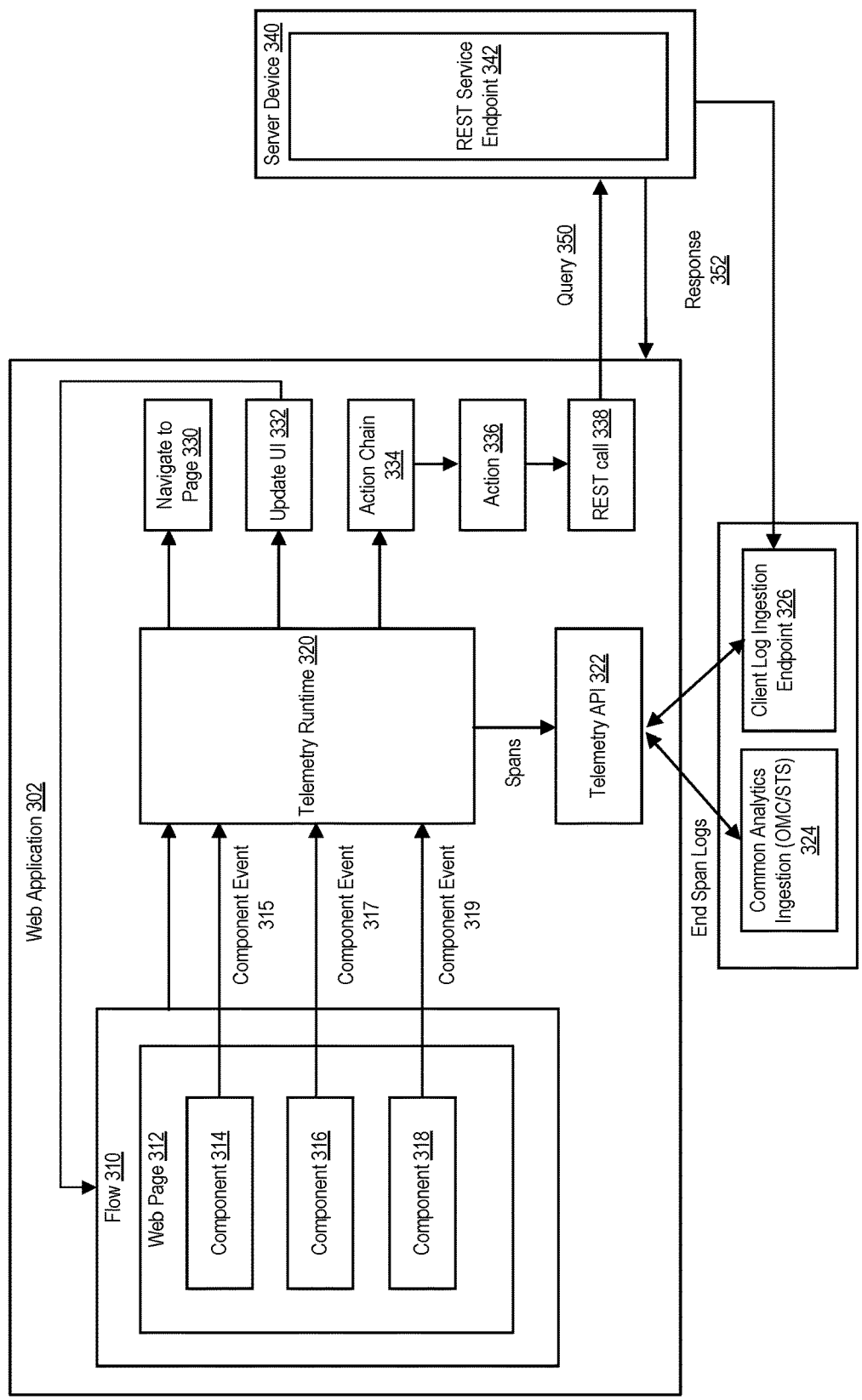
FIG. 3 depicts an example of an instrumented application for generating span context, according to certain aspects of the disclosure.
Figure 4:
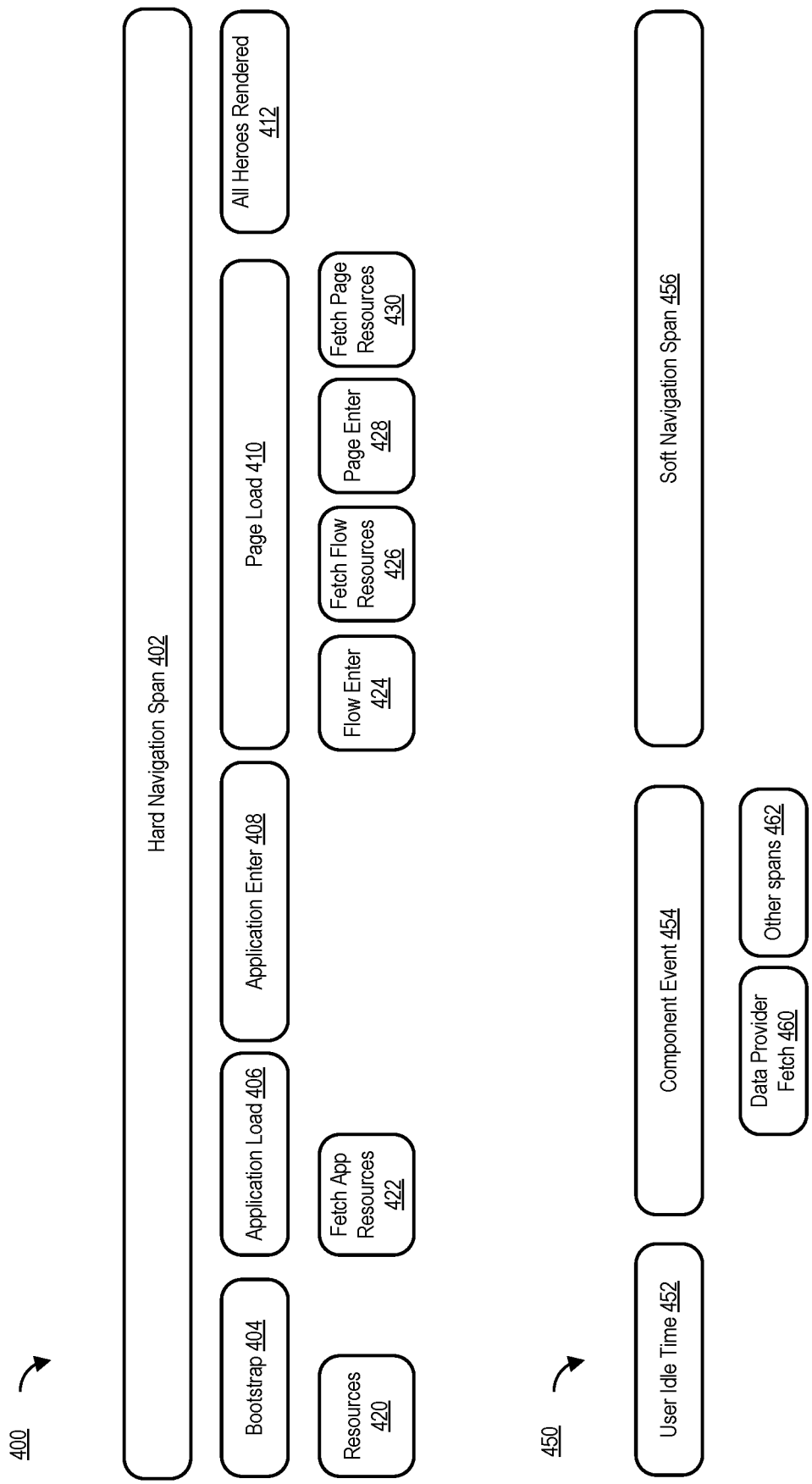
FIG. 4 depicts an example of hard and soft navigation span hierarchies, according to an aspect of the present disclosure.
Figure 5:
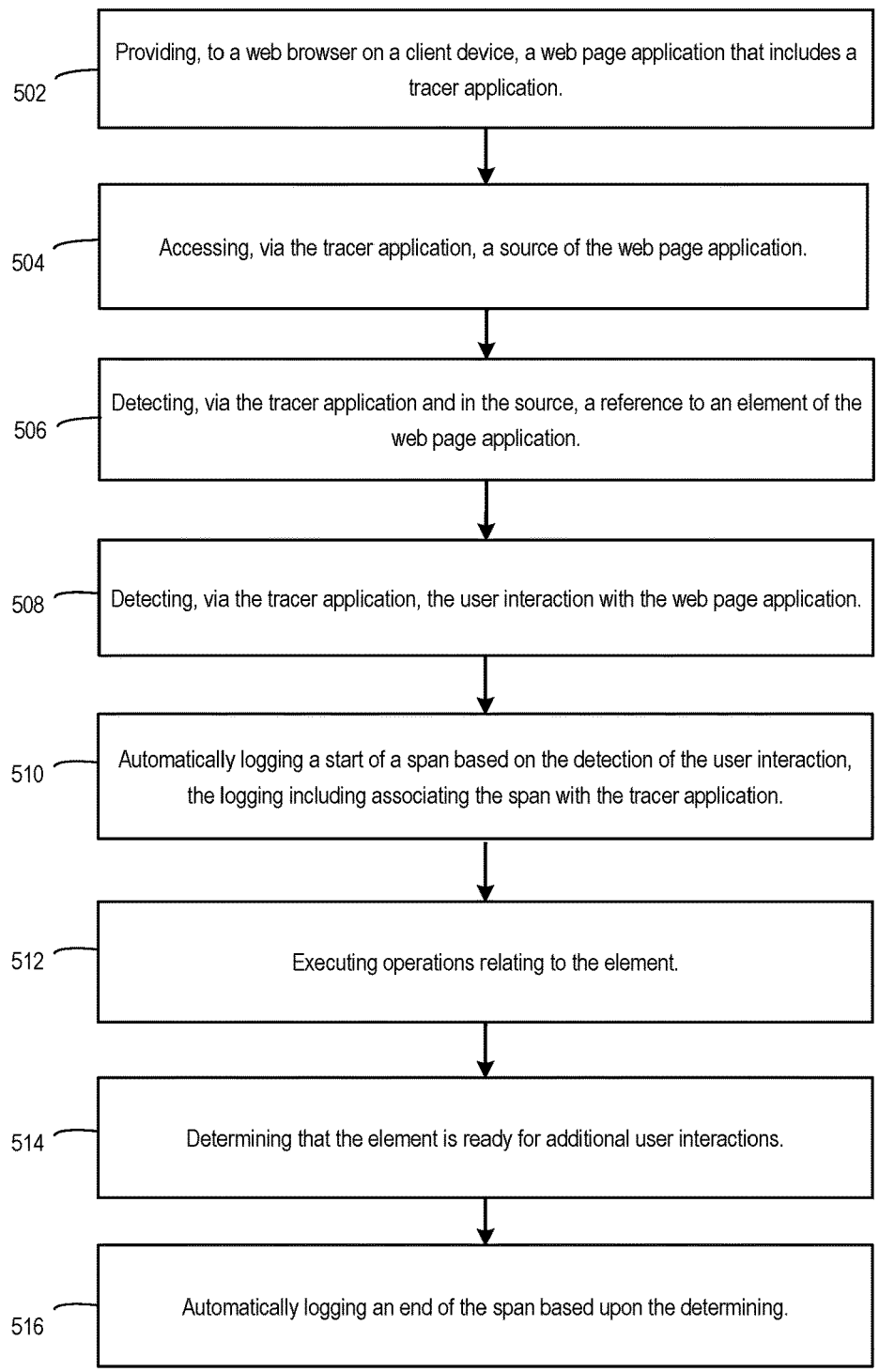
FIG. 5 depicts an example of a method used to gather telemetry data for priority elements, according to an aspect of the present disclosure.
Figure 7:
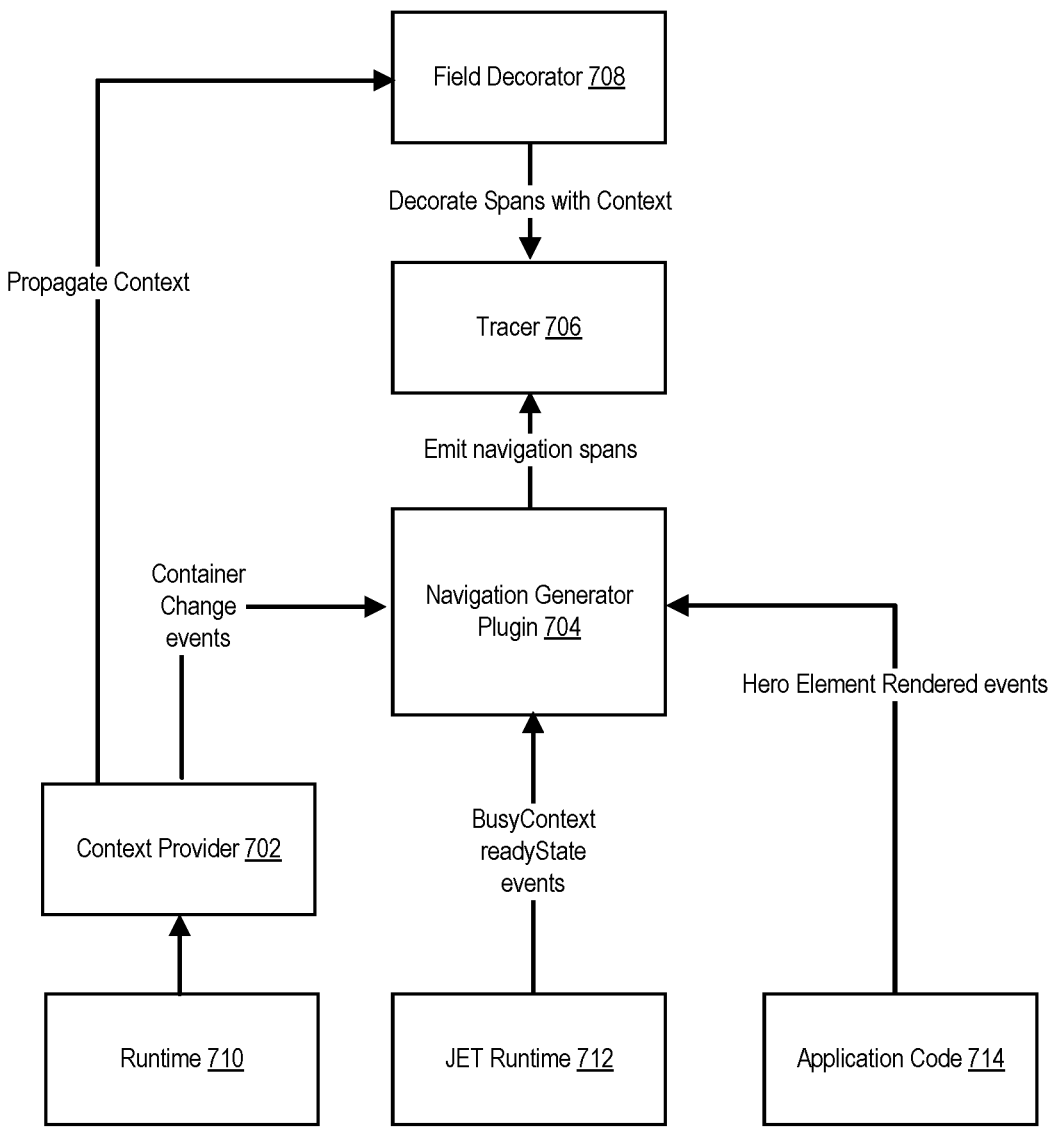
FIG. 7 depicts tracer components within an instrumented application that are used to generate span context and logs, according to certain aspects of the disclosure.
Figure 8:
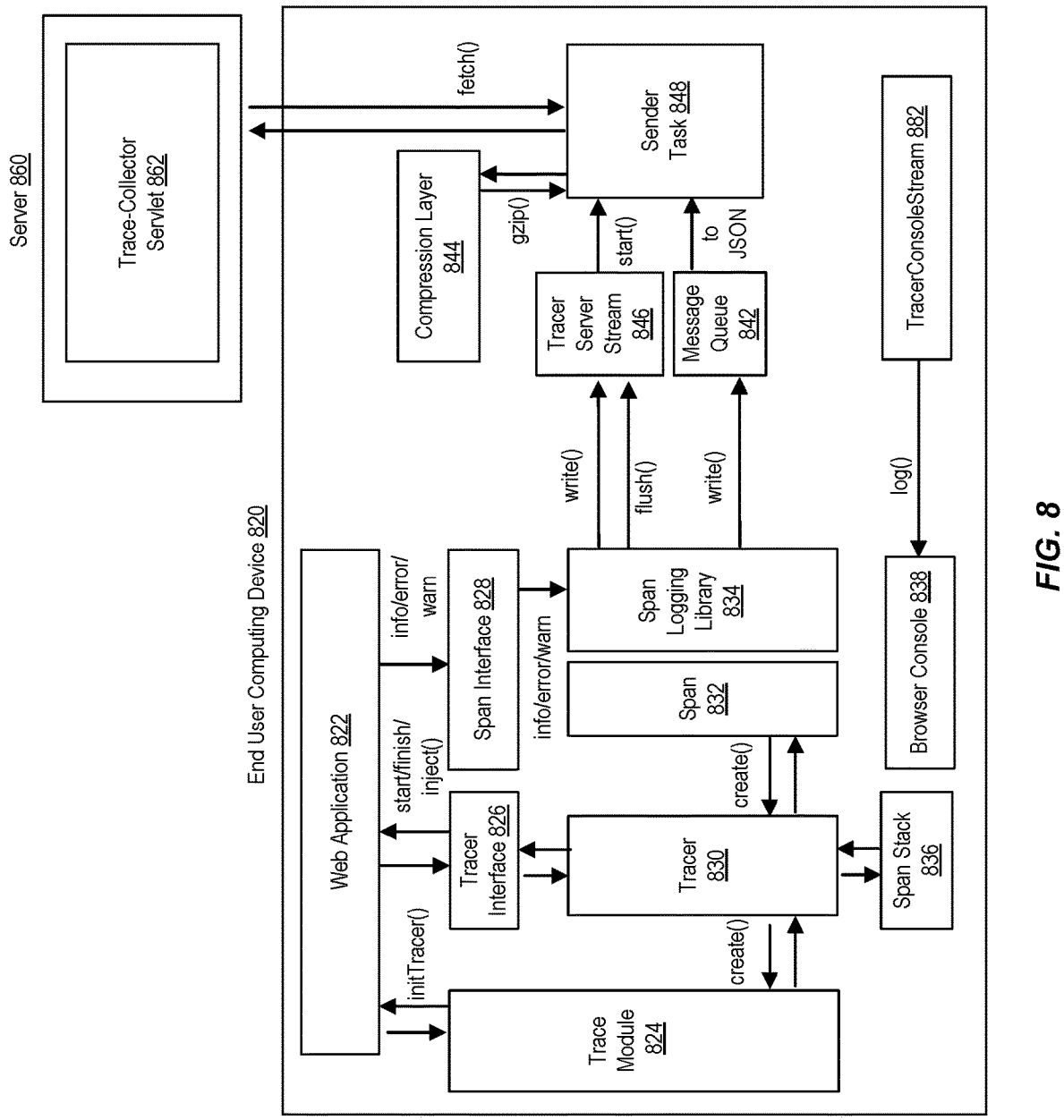
FIG. 8 depicts various runtime components of an instrumented application, according to certain aspects of the disclosure.
Figure 9:
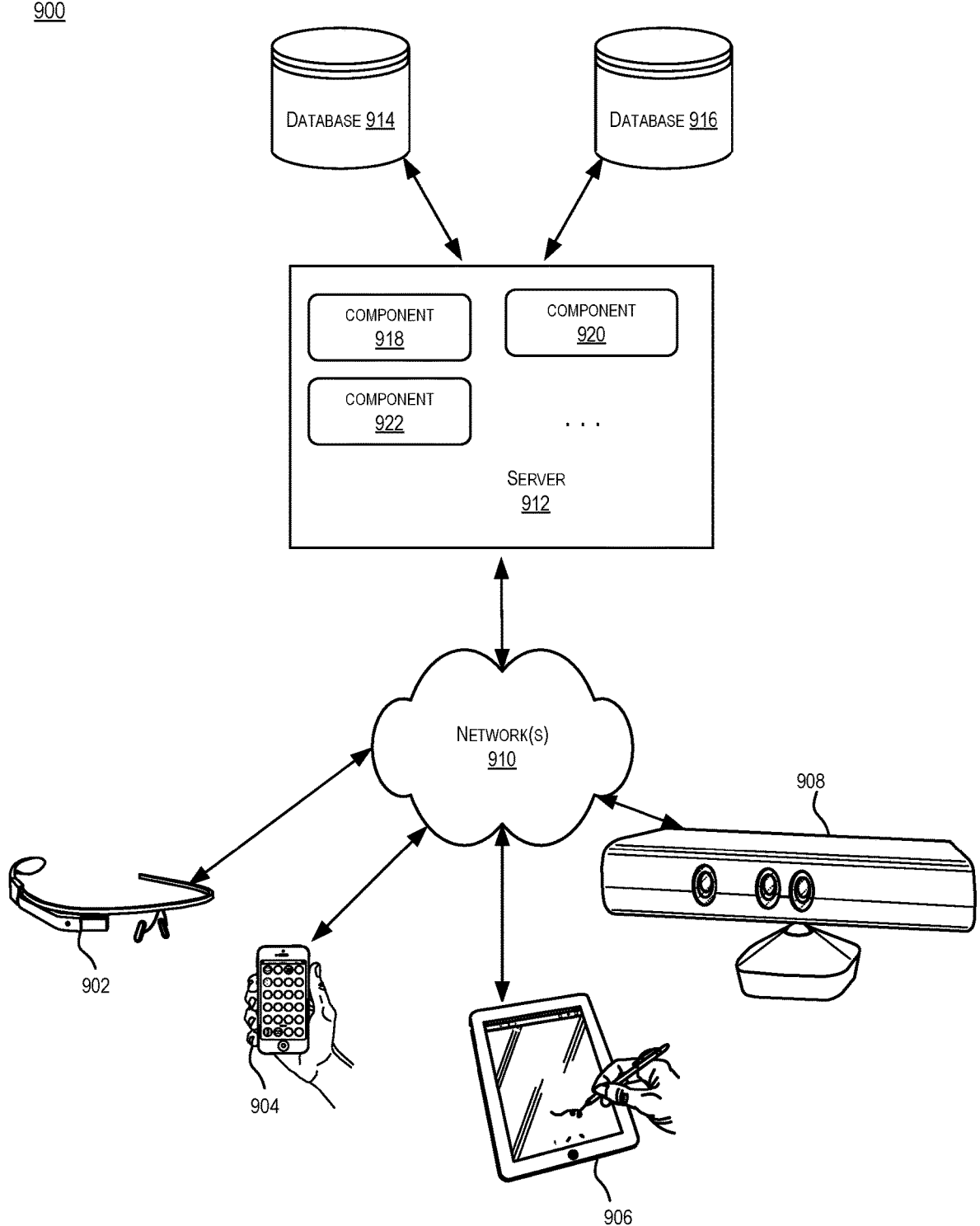
FIG. 9 depicts a simplified block diagram of a distributed system for implementing one of the aspects.

Certain figures and associated description further explain certain aspects. For instance, an example of a process used by an instrumented application to obtain telemetry data is shown in FIG. 2. An example of an instrumented application is shown in FIG. 3; an example of navigation spans is shown in FIG. 4; an example of a process used by an instrumented application to obtain telemetry data from priority elements within a single-page web application is shown in FIG. 5; an example of a web page having dynamically loaded elements is shown in FIG. 6; an example of tracer components within an instrumented application is shown in FIG. 7; and an example of various runtime components of an instrumented application is shown in FIG. 8. Examples of suitable computing devices for developer computing device 110 and end user computing device 130 include those depicted in client computing devices 902, 904, 906, and 908 and examples of suitable servers include server 912, are depicted in FIG. 9.

FIG. 2 depicts an example of a method 200 used to gather telemetry data, according to an aspect of the present disclosure. Method 200 can be performed by one or more of developer computing device 110 and servers 150a-n.

It should be appreciated that method 200 provides a particular method for gathering telemetry data. Other sequences of operations may also be performed according to alternative examples. For example, alternative examples may perform the operations outlined below in a different order. Moreover, the individual operations illustrated by method 200 may include multiple sub-operations that may be performed in various sequences as appropriate to the individual operation. Furthermore, additional operations may be added or removed depending on the particular applications. Further, the operations described in method 200 may be performed by different devices.

At block 202, method 200 involves providing a web page application to a web browser on a client device. For instance, server 150a serves web page application 134 to web browser 132. Web page application 134 includes tracer application 136, which provides instrumentation. Web page application 134 instrumented with tracer application 136 prior to method 200.

At block 204, method 200 involves detecting a start of the web page application. Web browser 132 begins executing web page application 134 and tracer application 136. Server 150a can detect the start of the execution by determining that web browser 132 has requested one or more resources.

At block 206, method 200 involves instantiating, based on a start of the web page application, the tracer application. Tracer application 136 is configured to log tracing data for web page application 134.

At block 208, method 200 involves detecting an event initiated by interaction with the web page application. Web page application 134 continues to execute and an event is triggered. Examples of events include user interface interactions, clicks, navigations, mouse-overs, refreshes, etc. Additionally, an event can be representational state transfer (REST).

At block 210, method 200 involves automatically logging a start of a span based on the detection, the logging associating the span with the tracer application. Tracer application 136 causes the logging of a span that corresponds to the event.

At block 212, method 200 involves executing operations corresponding to the event. Web browser 132 executes code corresponding to the event, such as loading an image or resource.

At block 214, method 200 involves automatically logging an end of the span based upon a completion of the operations corresponding to the event. Upon the completion of the code referred to in block 212, tracer application 136 logs the end of the span. Data collected can include processing cycles used, time taken to execute the span, memory consumption, and so forth.

As discussed herein, certain aspects can measure data relating to a span that crosses multiple servers, processing threads, or uses multiple separately identifiable operations. For instance, an execution of block 210 can result in additional spans, each providing more granular information, being created. For instance, the tracer application 136 can create a first child span corresponding to a first operation and a second child span corresponding to a second operation. The first and second child spans can be children of the span.

Continuing the example, tracer application 136 automatically logs an end of the first child span based on completion of the first operation and automatically logs an end of the first child span based on completion of the first operation. Therefore, the tracer application 136 obtains more granular information than just the span alone. The first child span and the second child span are associated with the span.

An example below shows code for an insertion of a client-side span context using Javascript:

```
define(["@oracle/trace-client/trace",
    "@oracle/trace-client/trace_utils"],
    (Trace, TraceUtils) => {
        //Create a tracer
        const tracer = Trace.initTracer({
            url: getCollectorUrl( )   //Domain-specific
        });
        //Create a root span
        tracer.span({
            operationName: "rootSpan"
        }, (span) => {
            //Log a simple message
            rootSpan.info("Here's a message");
            //Log a message with custom fields
            rootSpan.info({messageStatus: 'lit'}, "This message is lit.");
            //Create a child span (if desired)
            tracer.span({
                operationName: "childSpan2",
            }, (childSpan) => {
                //Create a fetch request
                let request = new Request("http://.../myService/endpoint");
                //Inject the child span's context
                request = tracer.inject(childSpan, request);
                //Make the fetch call
                fetch(request).then((response) => {
                    // ... process the response
                    // Close the child span
                    childSpan.finish( );
                });
            }); // end child
            //Close up root span when we're done
            rootSpan.finish( );
        }); //end root
    }); //end process response
}); //end define
```

FIG. 3 depicts an example of an instrumented application for generating span context, according to certain aspects of the disclosure. The instrumented application can be built and instrumented by a software development tool such as developer IDE 112 and may be executed a browser executing on a computing device. FIG. 3 depicts web application environment 300, which includes web application 302, server 340, query 350, and a response 352. In the example depicted in FIG. 3, web application 302, which is instrumented with tracer capabilities executes on a web browser, communicating with server 340 to serve one or more web pages. Web application 302 sends one or more queries 350 and receives in response, one or more responses 352. While FIG. 3 is described with regard to a web page, it should be appreciated that the flow and components can be executed by a mobile application, or other application.

Web application 302 shows a flow 310, which includes web page 312 having components 314, 316, and 318. The components can be mobile applications, web applications, service connections, business objects, or processes. Each component can perform different functionality such as part of a web page. Each of components 314, 316, and 318 can cause component events 315, 317, and 318 respectively. Each of component events 315, 317, and 318 trigger one or more occurrences in the telemetry runtime 320, which in turn causes one more actions to be performed, while logging the events.

Modules of a flow 310 or a web page 312 may interact or relate to each other. For instance, for a particular web page, the components may be user interface (UI) components, variables, action chains, web page flows, and page navigation, and data access through REST endpoints. Variables can be a mechanism used to store and manage a state of the browser settings, client device settings, user settings or other parameters. The components of the web page can interact with a telemetry runtime that processes various events for each component.

The telemetry runtime 320 can generate actions or action changes that correspond to component events 315, 317, and 319. For example, a user may click on a particular visual element of the web page displayed within the browser, causing a component event. The telemetry runtime 320 may determine that the web browser should navigate to a new web page 330. The telemetry runtime 320 may determine that the action associated with the user click is to update a portion of a user interface (UI) of the web page 312.

In another example, the telemetry runtime 320 may initiate an action chain 334 that corresponds to the steps to update the portion of the UI. For instance, an action chain may be a set of one or more individual actions that are related or sequential actions 336. Each action chain can be triggered by an event. For example, a user click can trigger navigation to a page that corresponds to the location on the browser that the user click was received (e.g., a hyperlink, a navigation button, etc.). An action chain can define input parameters and local variables that are available within the scope of that action chain, and can include application-scoped parameters and variables. The telemetry runtime may determine that one or more REST calls 338 to the server are needed to update the portion of the UI.

In response to REST call 338, web application 302 sends a query 350 to the a REST service endpoint 342 of server 340. The query 350 can include an injection span context. In return, the server 340 sends back a response 352, which can include additional HTTP headers. The web application 302 then uses the response to complete the actions caused by the component event(s).

Flows of a web page and page navigation govern the communication of information between a first page to a second page. Each web page has a predefined lifecycle, as does each application that is running in the browser. Each lifecycle event, such as entry or exit from a page, can provide a trigger for an action chain. All data entering a mobile or web application may be based on REST protocols. This data can come from custom business objects and from business objects provided by service connections. Actions and variables control how data is sent to and from a REST endpoint in a mobile or web application. Action chains have a well-defined context and contract: an action chain orchestrates its underlying actions, coordinating state flow and the execution path. The action chain can define input parameters and local variables that are only available in that context. An example of an action chain is one that makes a REST call (first action), then takes the result of that and stores that in a variable (second action). Actions may export a new state to that context, but it is only available to future actions along that same action chain. An action chain can be created in the context of a page or the application and exists within the scope of the page or the application. It has a defined interface and contract and can be called by event triggers using its ID.

A telemetry Application Programmer Interface (API) 322 can enable programmer access to the activities of the telemetry runtime, any actions or action chains, component events, and other related activities (e.g., a server response to an action). The telemetry API 322 can output span logs to a database, storage medium, or another server or browser for additional processing. In one example, the telemetry API may be a REST API. The telemetry API 322 can store cloud infrastructure objects such as audit logs, application flow logs, or other log files. The telemetry API 322 may periodically sample the stored cloud infrastructure objects to output telemetry data to common analytics ingestion 324 or a client log ingestion endpoint 326.

Common analytics ingestion 324 may ingest log data from telemetry API 322. In one example, the common analytics ingestion 324 can ingest log data from cloud infrastructure object storage using a REST API. In one example, the common analytics ingestion 324 may determine storage locations for the collected log data. The common analytics ingestion 324 can ingest various log data at a user, group, or organization level. In some examples, common analytics ingestion 324 can transform the log data into a visualization for an analytics console.

A client log ingestion endpoint 326 can also be configured to receive log data from the telemetry API 322. The client log ingestion endpoint 326 can store log data, transform log data into various visualizations, or perform additional processing to log data.

Generally, distributed tracing may be implemented using a Trace-Client API within the distributed tracing architecture. The Trace-Client API consists of a tracer which is used to create spans around operations within an application. Spans can have child spans that indicate smaller granularity operations of the respective parent span, which can, in turn, have children that indicate smaller granularity operations than the first child span. A set of spans emanating from a single parent may be considered a trace. Spans contain metadata about the operation they are measuring, along with some identifying information. For applications with operations that make out-of-process calls (for example, a client application making a call to a REST service), span context can be propagated along with the outgoing request (for example, in the form of special HTTP headers). The receiving application or server can extract the span context and use it to create child spans of the parent span on the client. The Trace-Client API has the ability to output span information in the form of log messages (one each for the beginning and end of spans) to various backend servers.

An example of application spans is a simple application flow. For instance, a user navigates to a web page and click a button. The button click triggers an event, which causes the application to call an event handler. The event handler makes a REST (define) request, which is processed by a REST service. The service returns a response, which causes the user interface of the application to be updated.

As discussed, certain aspects relate to improved instrumentation of single web-page applications, including instrumentation of hard and soft hierarchies and dynamically loaded elements. FIG. 4 illustrates a hierarchy with various spans that can be obtained, including various metrics relating to priority (hero) elements.

FIG. 4 depicts an example of hard and soft navigation span hierarchies, according to an aspect of the present disclosure. FIG. 4 depicts hard navigation span hierarchy 400 and soft navigation span hierarchy 450. As discussed, a hard navigation includes actions taken as a result of a browser navigation. A browser navigation can be caused by a user navigating to a Uniform Resource Locator (URL) or by accessing a bookmark. Hard navigation span hierarchy 400 therefore includes all necessary loading of elements on the page. By contrast, a soft navigation is caused by a user interaction with the page. Accordingly, soft navigation hierarchy 450 includes actions taken as a result of the soft navigation, including loading of necessary elements.

As can be seen, under hard navigation span hierarchy 400, there are multiple separate hierarchies relating to the initial user navigation. As can be seen, hard navigation span 402 includes bootstrap 404, application load 406, application enter 408, page load 410 and all heroes rendered 412. Bootstrap 404 is a span that represents loading the application via a bootstrap process. Application load 406 represents loading of the application. Application enter 408 represents entering the application. Page loading 410 represents loading of the web page. In turn, bootstrap 404 includes resources 420, application load 406 includes fetch app resources 422, page load 410 includes flow enter 424, fetch flow resources 426, page enter 428, and fetch page resources 430. Bootstrap 404 relates to additional telemetry.

Continuing the example, soft navigation hierarchy 440 includes user idle time span 452, component event span 454, soft navigation span 456, data fetch provider span 460, and other spans 462. Soft navigation span 456 also includes page load span 410 and all heroes rendered span 412.

One or more of the spans and span hierarchies shown in FIG. 4 can be instrumented. For instance, navigation-related spans can be instrumented. The spans represent a length of time between a user action and when all the page elements are loaded and rendered. Soft navigations will also include resource child spans for any resources loaded, captured asynchronously. Examples of attributes for a soft navigation span are shown below:

| Attribute | Type | Description (including context information for the container) |
|---|---|---|
| 1 name* | string | "navigation/soft" |
| 2 nav.title | string | Title of the page as shown in the browser when navigation completes |
| 3 container.id | string | Unique ID of the container |
| 4 container.parent_id | string | Optional. Unique ID of the container's immediate parent. |
| 5 container.path | string | Path through container hierarchy to this container |

-continued

| Attribute | Type | Description (including context information for the container) |
|---|---|---|
| 6 container.type | string | One of Page, Flow, Application, AppExtension, AppPackage, PackageFlow, PackagePage (others?) |
| 7 vb.appui_id | string | ID of the current container's AppUI, if applicable |
| 8 vb.user_guid | string | ID of the current user |

In certain cases, a root span that encompasses an entire logical navigation of the web page application (e.g., as depicted in FIG. 4) can be captured and emitted. The root span can therefore include: loading of artifacts (FlowLoad, pageLoad, etc.), runtime events for each container (runtimeEvents such as vbEnter for each of Flow, Page, AppPackage, etc.), page activation (pageActivate), low-level resource timings (resource), and metrics relating to priority elements, if available. The root span will be a child of the componentEvent that caused the navigation (if available).

Instrumentation of Priority Spans

To obtain detailed telemetry data, instrumentation of a web page application is performed. Generally, a developer of the web page tags various elements in the source of the web page with one or more attributes.

For instance, a developer can mark a user interface (UI) element with a specific attribute that will cause a metric to be emitted when a priority (or "hero") element is rendered (metric/heroRendered). Priority elements can be specified by the application developer by adding a configurable attribute (default can be data-otel-hero) to any HTML element, indicating a label to identify the element. This approach functions for both JavaScript Extension Toolkit (JET) custom HTML elements (oj-*, oj-sp-* elements) and Preact-rendered standard DOM elements.

A developer can also instrument the application in such a manner that an additional metric is emitted when all priority elements are rendered (metric/allHeroesRendered), which can carry the timestamp of the arrival of a most recent priority element. Additionally or alternatively, a developer can mark a user interface (UI) element with metrics that will cause a metric to be emitted when a priority element is ready. For instance, the metrics (metric/heroReady) and (metric/allHeroesReady) can be added in addition to the rendered metrics discussed above.

Examples of attributes are provided below.

| metric/heroRendered ||| 
|---|---|---|
| Attribute | Type | Description |
| hero.label (new) | string | Developer-provided label of the hero element |

| metric/heroReady ||| 
|---|---|---|
| Attribute | Type | Description |
| hero.label | string | Developer-provided label of the hero element |
| hero.timed_out | boolean | True if the whenReady() promise timed out |

| metric/allHeroesRendered/metric.allHeroesReady ||| 
|---|---|---|
| Attribute | Type | Description |
| hero.elements (new) | string | List of all heroes that arrived in this navigation, separated by spaces. |

As discussed with respect to FIG. 5, priority (hero) element instrumentation can be accomplished via a mutation observer on elements with the specified attribute. A metric heroRendered message can be emitted at the detection time of each element. A metric allHeroesRendered can be emitted before the navigation span closes, indicating the time of the most recent hero element (the same time and duration as the metric heroRendered span for the last hero metric that arrived at the time the navigation ended). The metric heroReady and metric allHeroesReady metrics can be emitted for any hero elements that are also carrying the JET data-oj-context attribute. A metric heroReady can be emitted when the element's Context busy state is resolved (via BusyContext.whenReady( )), with metric allHeroesReady being emitted when the navigation completes, indicating the time of the most recent metric heroReady event. Child spans with operationName metric heroRendered and metric allHeroesRendered can be emitted for both hard and soft navigations. Such metrics are based on the arrival of priority elements in the application.

| Metric | Duration and Description |
|---|---|
| heroRendered | The time from the start of the navigation until the hero element arrived in the DOM. |
| heroReady | The time from the start of the navigation until the hero element's BusyContext.whenReady() Promise resolved OR until the timeout expired |
| allHeroesRendered | The time from the start of the navigation until the last hero element arrived in the DOM at the time the navigation completed. |
| allHeroesReady | The time from the start of the navigation until the last hero element's BusyContext.whenReady() Promise resolved/timed out at the time the navigation completed. |

Before deployment, the web page application is instrumented, including indication of any priority elements. FIG. 5 depicts an example of a method used to perform analysis of an instrumented web page application.

FIG. 5 depicts an example of a method 500 used to gather telemetry data for priority elements, according to an aspect of the present disclosure. Method 500 can be performed by one or more of developer computing device 110 and servers 140a-n. For illustrative purposes, FIG. 6 is discussed with respect to FIG. 6. FIG. 6 illustrates an example of a web page application.

It should be appreciated that method 500 provides a particular method for gathering telemetry data. Other sequences of operations may also be performed according to alternative examples. For example, alternative examples may perform the operations outlined below in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices.

FIG. 6, which includes views 6A and 6B, depicts an example of a web page application 600 having priority elements, according to an aspect of the present disclosure. FIG. 6 depicts web page application 600, which relates to expense reports. For instance, by navigating around web page 600, a user may view their previously-submitted expense reports, view expense policies and/or submit new expense reports.

Returning to FIG. 5, at block 502, method 500 involves providing, to a web browser on a client device, a web page application that comprises a tracer application. For instance, server 150a serves web application 600 to web browser 132. Web application 600 includes tracer application 136, which provides instrumentation. Web application 600 is instrumented with tracer application 136 prior to method 500.

FIG. 6A depicts web page application 600 having two elements, element 612 and element 614. Elements 612 and 614 load upon a navigation to web page application 600 (e.g. a hard navigation). In the example depicted, a user interacts with, e.g., clicks on, element 614. As discussed below, FIG. 6B includes elements that load upon a soft navigation.

Method 500 can involve detecting a start of the web page application. Web browser 132 begins executing web application 600 and tracer application 136. Server 150a can detect the start of the execution by determining that web browser 132 has requested one or more resources. Method 500 can involve instantiating the tracer application based on a start of the web page application, Tracer application 136 is configured to log tracing data for web application 600.

At block 504, method 500 involves accessing, via the tracer application, a source of the web page application. As discussed above, the source of web page application 600 is instrumented with one or more attributes that facilitate analytics. Continuing the example, web page application 600 is instrumented with a "heroReady" attribute.

At block 506, method 500 involves detecting, via the tracer application and in the source, a reference to an element of the web page application. Continuing the example, the user navigates to element 614 of web page application 600.

In some cases, the source of the web page application is accessed by a mutation observer. A mutation observer executes within tracer application 136 or web page application 600 and determines whether any source code has changed. For example, the mutation observer analyzes attributes of the elements in the web page to detect priority (hero) attributes. For example, if the mutation observer detects a priority element, i.e., an element with a "hero" attribute, then the mutation observer notifies tracer application 136.

Tracer application 136 analyzes the source of web page application 600. The tracer application 136 detects element 614 having a priority designation.

At block 508, method 500 involves detecting, detecting, via the tracer application, the user interaction with the web page application. An example of a user interaction is an event. Examples of events include user interface interactions, clicks, navigations, mouse-overs, refreshes, etc. Additionally, an event can be representational state transfer (REST).

Continuing the example, FIG. 6B depicts web page application 600 having element 612, element 614, and soft elements 620, 622, and 624. These elements, which are associated with previously filed expense reports, are soft elements because they are not loaded until a user interacts with element 614. When a user does so, they cannot effectively use web page application 600 until elements 620, 622, and 624 are loaded. Accordingly, a developer may designate elements 620, 622, and 624 as priority elements, because these elements likely represent the first tasks that a user will want to complete.

Returning to FIG. 5., at block 510, method 500 involves automatically logging a start of a span based on the detection of the user interaction, the logging comprising associating the span with the tracer application. The tracer application 136 detects the user interaction with element 614.

Upon detection of the user interaction, tracer application 136 starts logging one or more spans corresponding to the user interaction. For instance, tracer application 136 can log a first span that corresponds to the rendering of the element and a second span that corresponds to the element being ready.

At block 512, method 500 involves-executing operations relating to the element. Examples of operations include loading an image or resource.

The operations can include a subset of operations that are associated with rendering of the element 522. In some cases an additional span can be obtained that corresponds to when the element is rendered, separate from when the element is ready (as determined at block 514 below). For example, tracer application 136 can automatically start an additional span related to a subset of the operations associated with a rendering of the element. The additional span can be a child span of the span associated with readiness (as determined at block 514 below). Tracer application 136 can automatically log an end of the additional span based upon a completion of the subset of the operations associated with rendering.

Continuing the example, referring again to FIG. 6, soft element 522 may require an image to be loaded. If so, then the corresponding image is loaded, which requires various operations. When the image is received, it is rendered on the web page application, which requires additional computational operations. As discussed, in some cases, a metric can be emitted when an element is rendered.

In some aspects, the image or resource can be remotely hosted, for instance on an external server. If so, detailed instrumentation can be obtained in relation to operations performed on that server. For instance, the web browser 132 can transmit a request for the element to an external server and create a child span based on the transmitting. Then, the web browser 132 receives the element from the external server and can automatically log an end of the child span based on receiving the element. web browser 132 can associate the child span with the span that is associated with the soft navigation (e.g. the span obtained at block 516 below).

At block 514, method 500 involves determining, the element is ready for additional user interactions. Additional operations are generally required beyond rendering for the element to be ready. For example, certain operations may need to complete to ensure that the element can be interacted with by the user such as being configured to receive input or to transition between states.

At block 516, method 500 involves automatically logging an end of the span based upon the determining. Tracer application 136 automatically logs an end of the span based upon a completion of the operations corresponding to the element. Automatically logging the end of the span therefore can include determining a number of processing cycles corresponding to the execution of the operations and/or an execution time of the operations.

Method 500 can continue for additional priority elements. For instance, method 500 can involve determining, from the source of the web page application, that an additional element is triggered by the user interaction. In response to the determining that the additional element is triggered by the user interaction, blocks 508-516 for additional elements. Additionally or alternatively, a combined span representing completion of all of the spans associated with readiness of elements can be calculated.

Telemetry data 122 provided by tracer application 136 and web application 134 can include an output stream including spans relating to any priority metrics. In this manner, a developer can match hero element metric data with screenshots taken during a profiling session (i.e., in Chrome Devtools, etc.).

FIG. 7 depicts various runtime components 700 of an instrumented application, according to certain aspects of the disclosure. FIG. 7 depicts context provider 702, navigation generator plugin 704, tracer 706, field decorator 708, and runtime 710, JET runtime 712, and application code 714. Components 700 are discussed for illustration purposes only: other arrangements are possible.

Context provider 702 tracks a current execution context of the application. For example, context provider 702 will track a current container as emitted during pageLoad and runtimeEvent spans (such as "enter" and "exit"). Context provider 702 can also emit events to indicate the container has changed, which will trigger the start of a new soft navigation.

Navigation generator plugin 704 will subscribe to container change events from context provider 702 to trigger a soft navigation. This can augment functionality under JetNavigationGenerator. JetNavigationGenerator CAN support soft navigations for JET-only applications, but this will require telemetry to be emitted by JET Router. add the ability to finish navigations based on the resolution of the JET Busy Context.whenReady Promise.

An example of tracer 706 is tracer application 136. An additional example of a tracer is shown in FIG. 78. Application code 714 reflects the web page application, i.e., web page application 134 or web page application 600.

Field Decorator 708 is a plugin to the tracer that adds attributes to telemetry spans based on runtime context. Runtime 710 is an application framework that executes application code and emits telemetry and contextual events. JET runtime 712 is an example of an application framework (which coexists with 710) emits "BusyContext whenReady" events based on the readiness of a page or element to determine soft navigation and/or hero element readiness.

FIG. 8 depicts tracer components within an instrumented application that are used to generate span context and logs, according to certain aspects of the disclosure. In the example depicted in FIG. 8, end user computing device 820, which executes web application 822, communicates with server 860 via various commands and/or API calls. Web application 822 can be developed by developer IDE 112 and can be customer-developed software. Code to support instrumentation is automatically added by developer IDE 112.

End user computing device 820 includes one or more modules such as web application 822 (or any other consuming client), trace module 824, tracer interface 826, span interface 828, tracer 830, span 832, a span logging library 834 (i.e., a Bunyan Logger), span stack 836, browser console 838, compression layer 844, tracer server stream 846, sender task 848, message queue 842, and tracer console stream 882. In turn, tracer 830 operates to perform instrumentation on web application and creates one or more spans 832 and adds active spans to span stack 836. Server 860 includes one or more modules such as a trace-collector servlet 862.

Subsequently, web application 822 receives or detects interactions from the user (e.g., a user click). Web application 822 interacts with trace module 824 and/or tracer interface 826 to start one or more tracers 830. In turn, span logging library 834 logs information and metadata such as an event type, name of the event, URL of a server request, status code of the return value, errors, warnings, and so forth via span interface 828.

Various API calls are available. The API call initTracer( ) initializes and returns a global tracer object. The API call initTracer is called once for an application context and returns a TracerOptions object. The API call activeTracer returns the global tracer object. For example, The API call inject( ) causes a span to be injected into a request (e.g., to a server). Upon return the API call extract( ) can be used to extract a span.

Multiple spans can be generated. For instance, tracer 830) can create a span to represent an event or a thread of the web application 822. Tracer 830 can create child spans as appropriate (e.g., as described with regard to FIG. 4) based on the particular operation for which the tracer created the span. As discussed further herein, instrumented applications can obtain information from different threads and/or different servers that service requests caused by the triggering of events in the application.

Web application 822 may use tracer interface 826 to control the tracer or receive injections for the span. The tracer may also monitor, write, or read to span stack 836 where one or more spans can be cached or accessed by the tracer to monitor parent spans, or insert span context within a newly created span such as span 832. Web application 822 may use span interface 828 to communicate span related information to a span logging library 834. Compression layer 844 can compress span related information minimization before it is sent to the trace-collector servlet 862. Examples of compression techniques used by compression layer 844 include zip and gzip. In one example, the tracer console stream 882 may output a stream of the span log to a browser console presented on the end user computing device 130. In turn, server 860) may execute a trace-collector servlet 862, which stream of span logs and collects traces from sender task 848 on end user computing device 820.

FIG. 9 depicts a simplified block diagram of a distributed system 900 for implementing one of the aspects. In the illustrated aspect, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with client computing devices 902, 904, 906, and 908 via network(s) 910.

In various aspects, server 912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (4D) representations, page-based logical environments, or otherwise. In some aspects, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of distributed system 900 are shown as being implemented on server 912. In other aspects, one or more of the components of distributed system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The aspect shown in the figure is thus one example of a distributed system for implementing an aspect system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.9 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various aspects, server 912 may be adapted to run one or more services or software applications described in the foregoing disclosure. For example, server 912 may correspond to a server for performing processing described above according to an aspect of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of aspects, databases 914 and 916 may reside in a storage-area network (SAN). Similarly, any necessary files for performing the functions attributed to server 912 may be stored locally on server 912 and/or remotely, as appropriate. In one set of aspects, databases 914 and 916 may include relational databases, such as databases provided by Oracle, that are adapted to store, update, and retrieve data in response to SQL-formatted commands.

Figure 10:
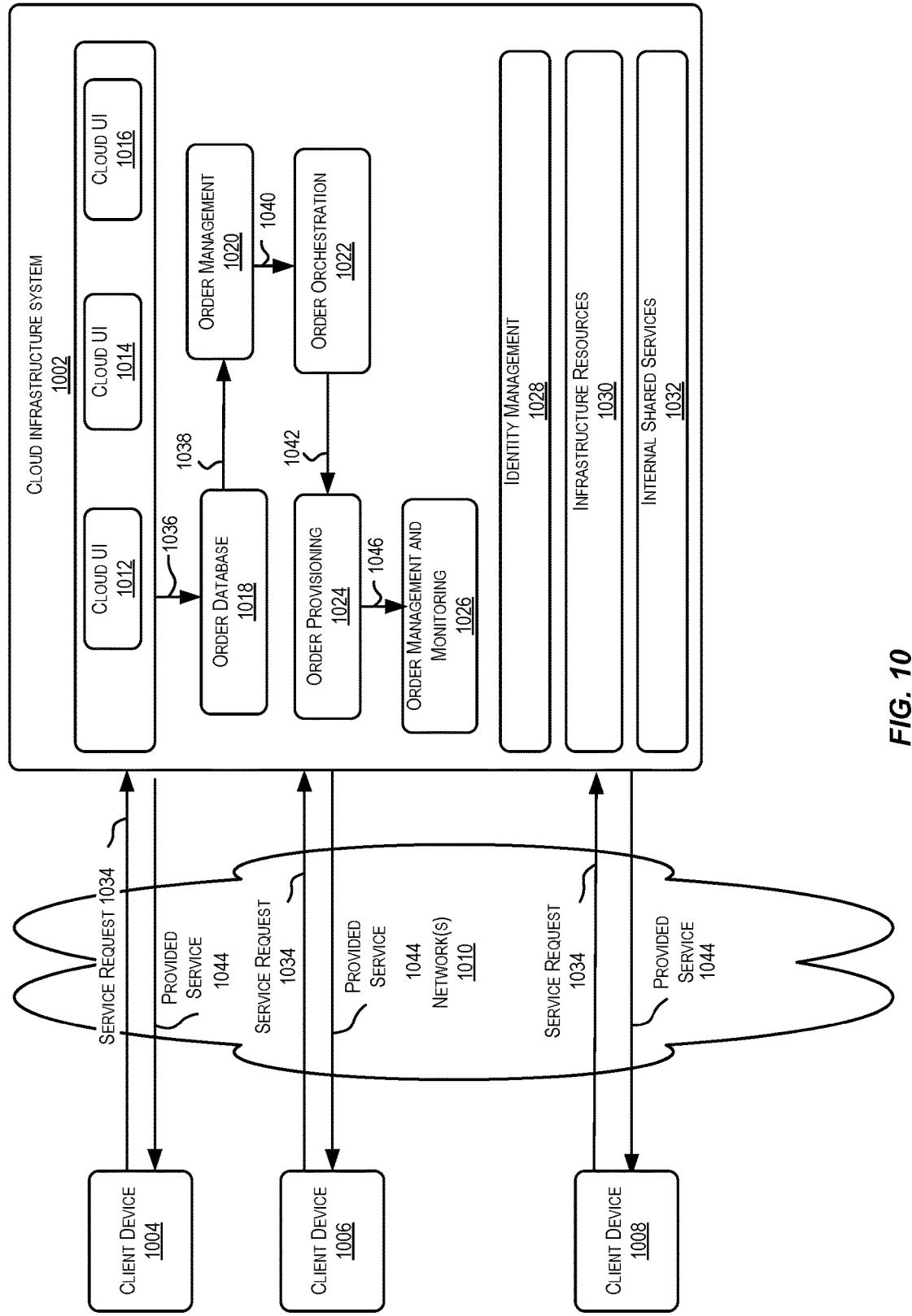
FIG. 10 is a simplified block diagram of components of a system environment by which services provided by the components of an aspect system may be offered as cloud services in accordance with an aspect.

FIG. 10 is a simplified block diagram of one or more components of a system environment 1000 by which services provided by one or more components of an aspect system may be offered as cloud services in accordance with an aspect of the present disclosure. In the illustrated aspect, system environment 1000 includes one or more client devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the aspect shown in the figure is only one example of a cloud infrastructure system that may incorporate an aspect of the invention. In some other aspects, cloud infrastructure system 1002 may have more or fewer components than shown in the figure, may combine two or more components, or may have a different configuration or arrangement of components.

Client devices 1004, 1006, and 1008 may be devices similar to those described above for 902, 904, 906, and 908.

Although exemplary system environment 1100 is shown with three client computing devices, any number of client computing devices may be supported. Other devices such as devices with sensors, etc. may interact with cloud infrastructure system 1002.

Network(s) 910 may facilitate communications and exchange of data between client devices 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some aspects, the services provided by cloud infrastructure system 1002 may include one or more services provided under Software as a Service (Saas) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some aspects, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the Saas platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud 30) Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the Saas platform and the PaaS platform.

In certain aspects, cloud infrastructure system 1002 may also include infrastructure resources 1030 for providing the resources used to provide various services to customers of the cloud infrastructure system. In one aspect, infrastructure resources 1030 may include pre-integrated and optimized combinations of hardware, such as servers, storage, and networking resources to execute the services provided by the PaaS platform and the SaaS platform.

In some aspects, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1002, and the like.

In one aspect, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain aspects, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1002 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain aspects, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by system environment 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1042, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain aspects, cloud infrastructure system 1002 may include an identity management module 1028. Identity management module 1028 may be configured to provide identity services, such as access management and authorization services in cloud infrastructure system 1002. In some aspects, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
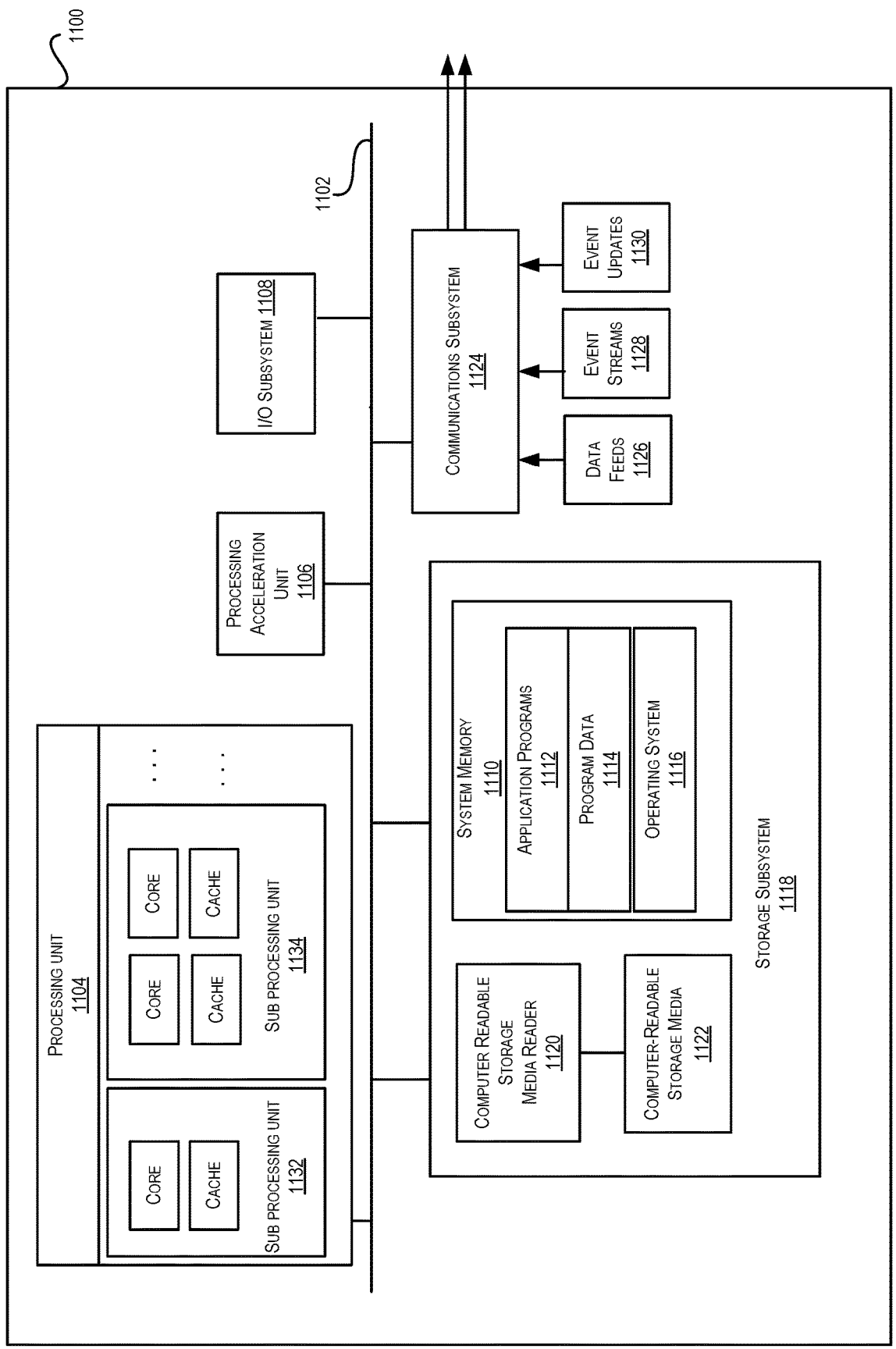
FIG. 11 illustrates an exemplary computing subsystem, in which various aspects of the present invention may be implemented.

FIG. 11 illustrates an exemplary computer system 1100, in which various aspects of the present invention may be implemented. The computer system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1120 and a system memory 119.

Bus subsystem 1102 provides a mechanism for letting the various components and subsystems of computer system 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1186.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain aspects, processing unit 1104 may be implemented as one or more independent processing units 1132 and/or 1134 with single or multicore processors included in each processing unit. In other aspects, processing unit 1104 may also be implemented as a quad-core processing unit formed by integrating two dual-core processors into a single chip.

In various aspects, processing unit 1104 can execute a variety of programs in response to program code and can maintain multiple concurrently executing programs or processes. At any given time, some or all of the program code to be executed can be resident in processing unit 1104 and/or in storage subsystem 1118. Through suitable programming, processing unit 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (4D) mice, joysticks or pointing sticks, gamepads and graphic tablets, and audio/visual devices such as speakers, digital cameras, digital camcorders, portable media players, webcams, image scanners, fingerprint scanners, barcode reader 4D scanners, 4D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 119 may store program instructions that are loadable and executable on processing unit 1104, as well as data generated during the execution of these programs.

Depending on the configuration and type of computer system 1100, system memory 119 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 119 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 119 also illustrates application programs 1112, which may include client applications, Web browsers, mid-tier applications, relational database management systems (RDBMS), etc., program data 119, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some aspects. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1118 may also include a computer-readable storage media reader 1120 that can further be connected to computer-readable storage media 1142. Together and, optionally, in combination with system memory 119, computer-readable storage media 1142 may comprehensively represent remote, local, fixed, and/or removable storage devices plus storage media for temporarily and/or more permanently containing, storing, transmitting, and retrieving computer-readable information.

Computer-readable storage media 1142 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1120 may include, but is not limited to, Zip® drives, flash memory cards, universal serial bus (USB) flash drives, secure digital (SD) cards, DVD disks, digital video tape, and the like. Computer-readable storage media 1120 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some aspects, communications subsystem 1124 can include radio frequency (RF) transceiver components for accessing wireless voice and/or data networks (e.g., using cellular telephone technology, advanced data network technology, such as 4G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1124 can provide wired network connectivity (e.g., Ethernet) in addition to or instead of a wireless interface.

In some aspects, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive unstructured data feeds 1126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone®) cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of instrumenting an application, the method comprising:
   providing, to a web browser on a client device, a web page application that comprises a tracer application;
   accessing, via the tracer application, a source of the web page application;
   detecting, via the tracer application and in the source, a reference to an element of the web page application, wherein the element is a soft navigation element that (i) is triggered by a user interaction with the web page application and (ii) is marked with a priority designation at development of the web page application;
   detecting, via the tracer application, the user interaction with the web page application;
   automatically logging a start of a span based on the detection of the user interaction, the logging comprising associating the span with the tracer application;
   executing operations relating to the element;
   determining that the element is ready for additional user interactions; and
   automatically logging an end of the span based upon the determining.

2. The method of claim 1, further comprising:
   automatically starting an additional span related to a subset of the operations, wherein the subset of the operations are associated with a rendering of the element and wherein the additional span is a child span of the span; and
   automatically logging an end of the additional span based upon a completion of the subset of the operations.

3. The method of claim 1, wherein detecting the reference to the element of the web page application comprises:
   executing, within the tracing application, a mutation observer that analyzes the source of a web page; and
   determining, via the mutation observer, that the source has changed.

4. The method of claim 1, wherein automatically logging the end of the span comprises determining one or more of: (i) a number of processing cycles corresponding to the execution of the operations or (ii) an execution time of the operations.

5. The method of claim 1, further comprising:
   determining, from the source of the web page application, that an additional element is triggered by the user interaction;
   in response to the determining that the additional element is triggered by the user interaction:
      automatically logging an additional start of an additional span, the logging comprising associating the additional span with the tracer application;
      executing additional operations relating to the additional element;
      determining that the additional element is ready for user interactions; and
      automatically logging an end of the additional span based upon the determining; and
   outputting a combined span representing completion of the span and the additional span.

6. The method of claim 1, further comprising determining that the element has the priority designation by identifying, in the source of the web page application, one or more attributes associated with the element.

7. The method of claim 1, wherein the operations relating to the element comprise:
- transmitting, to an external server, a request for the element;
- creating a child span based on the transmitting;
- receiving the element from the external server;
- automatically logging an end of the child span responsive to receiving the element; and
- associating the child span with the span.

8. A system comprising:
- a non-transitory computer-readable medium storing computer-executable program instructions; and
- a processing device communicatively coupled to the non-transitory computer-readable medium for executing the computer-executable program instructions, wherein executing the computer-executable program instructions configures the processing device to perform operations comprising:
  - providing, to a web browser on a client device, a web page application that comprises a tracer application;
  - accessing, via the tracer application, a source of the web page application;
  - detecting, via the tracer application and in the source, a reference to an element of the web page application, wherein the element is a soft navigation element that (i) is triggered by a user interaction with the web page application and (ii) is marked with a priority designation at development of the web page application;
  - detecting, via the tracer application, the user interaction with the web page application;
  - automatically logging a start of a span based on the detection of the user interaction, the logging comprising associating the span with the tracer application;
  - executing operations relating to the element;
  - determining that the element is ready for additional user interactions; and
  - automatically logging an end of the span based upon the determining.

9. The system of claim 8, wherein executing the computer-executable program instructions configures the processing device to perform operations comprising:
- automatically starting an additional span related to a subset of the operations, wherein the subset of the operations are associated with a rendering of the element and wherein the additional span is a child span of the span; and
- automatically logging an end of the additional span based upon a completion of the subset of the operations.

10. The system of claim 8, wherein detecting the reference to the element of the web page application comprises:
- executing, within the tracing application, a mutation observer that analyzes the source of a web page; and
- determining, via the mutation observer, that the source has changed.

11. The system of claim 8, wherein automatically logging the end of the span comprises determining one or more of: (i) a number of processing cycles corresponding to the execution of the operations or (ii) an execution time of the operations.

12. The system of claim 8, wherein executing the computer-executable program instructions configures the processing device to perform operations comprising:
- determining, from the source of the web page application, that an additional element is triggered by the user interaction;
- in response to the determining that the additional element is triggered by the user interaction:
  - automatically logging an additional start of an additional span, the logging comprising associating the additional span with the tracer application;
  - executing additional operations relating to the additional element;
  - determining that the additional element is ready for user interactions; and
  - automatically logging an end of the additional span based upon the determining; and
- outputting a combined span representing completion of the span and the additional span.

13. The system of claim 8, wherein executing the computer-executable program instructions configures the processing device to perform operations comprising determining that the element has the priority designation by identifying, in the source of the web page application, one or more attributes associated with the element.

14. The system of claim 8, wherein the operations relating to the element comprise:
- transmitting, to an external server, a request for the element;
- creating a child span based on the transmitting;
- receiving the element from the external server;
- automatically logging an end of the child span responsive to receiving the element; and
- associating the child span with the span.

15. A non-transitory computer-readable storage medium storing computer-executable program instructions, wherein when executed by a processing device, the computer-executable program instructions cause the processing device to perform operations comprising:
- providing, to a web browser on a client device, a web page application that comprises a tracer application;
- accessing, via the tracer application, a source of the web page application;
- detecting, via the tracer application and in the source, a reference to an element of the web page application, wherein the element is a soft navigation element that (i) is triggered by a user interaction with the web page application and (ii) is marked with a priority designation at development of the web page application;
- detecting, via the tracer application, the user interaction with the web page application;
- automatically logging a start of a span based on the detection of the user interaction, the logging comprising associating the span with the tracer application;
- executing operations relating to the element;
- determining that the element is ready for additional user interactions; and
- automatically logging an end of the span based upon the determining.

16. The non-transitory computer-readable storage medium of claim 15, wherein when executed by the processing device, the computer-executable program instructions cause the processing device to perform operations comprising:
- automatically starting an additional span related to a subset of the operations, wherein the subset of the operations are associated with a rendering of the element and wherein the additional span is a child span of the span; and
- automatically logging an end of the additional span based upon a completion of the subset of the operations.

17. The non-transitory computer-readable storage medium of claim 15, wherein detecting the reference to the element of the web page application comprises:
executing, within the tracing application, a mutation observer that analyzes the source of a web page; and
determining, via the mutation observer, that the source has changed.

18. The non-transitory computer-readable storage medium of claim 15, wherein automatically logging the end of the span comprises determining one or more of: (i) a number of processing cycles corresponding to the execution of the operations or (ii) an execution time of the operations.

19. The non-transitory computer-readable storage medium of claim 15, wherein when executed by the processing device, the computer-executable program instructions cause the processing device to perform operations comprising:
determining, from the source of the web page application, that an additional element is triggered by the user interaction;
in response to the determining that the additional element is triggered by the user interaction:
automatically logging an additional start of an additional span, the logging comprising associating the additional span with the tracer application;
executing additional operations relating to the additional element;
determining that the additional element is ready for user interactions; and
automatically logging an end of the additional span based upon the determining; and
outputting a combined span representing completion of the span and the additional span.

20. The non-transitory computer-readable storage medium of claim 15, wherein when executed by the processing device, the computer-executable program instructions cause the processing device to perform operations comprising determining that the element has the priority designation by identifying, in the source of the web page application, one or more attributes associated with the element.

* * * * *